US011980519B2

(12) United States Patent
Godlieb

(10) Patent No.: US 11,980,519 B2
(45) Date of Patent: May 14, 2024

(54) PERSONAL CARE APPARATUS

(71) Applicant: KONINKLIJKE PHILIPS N.V., Eindhoven (NL)

(72) Inventor: Robert Godlieb, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 502 days.

(21) Appl. No.: 17/277,333

(22) PCT Filed: Sep. 30, 2019

(86) PCT No.: PCT/EP2019/076345
§ 371 (c)(1),
(2) Date: Mar. 18, 2021

(87) PCT Pub. No.: WO2020/070036
PCT Pub. Date: Apr. 9, 2020

(65) Prior Publication Data
US 2022/0031436 A1 Feb. 3, 2022

(30) Foreign Application Priority Data
Oct. 4, 2018 (EP) .................................... 18198663

(51) Int. Cl.
A61C 17/22 (2006.01)
A47G 1/02 (2006.01)
B26B 19/38 (2006.01)

(52) U.S. Cl.
CPC .............. A61C 17/221 (2013.01); A47G 1/02 (2013.01); B26B 19/388 (2013.01)

(58) Field of Classification Search
CPC . A46B 15/0002; A46B 2200/00; A46B 17/00; A46B 13/00; A47G 1/02;
(Continued)

(56) References Cited

U.S. PATENT DOCUMENTS 7,976,388 B2   7/2011  Park et al.
11,337,785 B2  5/2022  Ortins et al.
(Continued)

FOREIGN PATENT DOCUMENTS

EP      3300866       4/2018
WO   2016173883      11/2016
(Continued)

OTHER PUBLICATIONS

International Search Report and Written Opinion dated Nov. 28, 2019 for International Application No. PCT/EP2019/076345 Filed Sep. 30, 2019.

*Primary Examiner* — Kidest Bahta

(57) ABSTRACT

There is provided a personal care apparatus that is configured to connect to a display apparatus. The personal care apparatus comprises a first control unit configured to: determine a current operation mode of the personal care apparatus as a usage mode or a control mode, and detect a first predetermined user maneuver. The first predetermined user maneuver corresponds to a control operation of the personal care apparatus in the usage mode and corresponds to a control operation of the display apparatus in control mode. When the first predetermined user maneuver is detected, the first control unit is further configured to: perform the control operation of the personal care apparatus if the determined current operation mode is the usage mode, or transmit a control signal corresponding to the control operation of the display apparatus to the display apparatus if the determined current operation mode is the control mode.

20 Claims, 12 Drawing Sheets

(58) Field of Classification Search
CPC .......... A47G 5/00; A47G 1/00; A61C 17/221; A61C 13/00; A61C 5/00; A61C 3/00; B26B 19/388; B26B 27/00; B26B 29/00
See application file for complete search history.

(56) References Cited

U.S. PATENT DOCUMENTS

| | | |
|---|---|---|
| 2012/0036657 A1 | 2/2012 | Iwahori |
| 2012/0320180 A1* | 12/2012 | Binder ................. H04N 23/661 348/333.01 |
| 2013/0021460 A1* | 1/2013 | Burdoucci ............ B26B 19/388 382/103 |
| 2013/0125326 A1 | 5/2013 | Schmid et al. |
| 2015/0197016 A1* | 7/2015 | Krenik ................ B26B 21/4081 83/13 |
| 2018/0085942 A1* | 3/2018 | Perez Lopez ....... B26B 19/3886 |

FOREIGN PATENT DOCUMENTS

| | | |
|---|---|---|
| WO | 2017108700 | 6/2017 |
| WO | 2018/060232 | 4/2018 |

\* cited by examiner

| Event | Off | Control | Usage |
|---|---|---|---|
| 1110 — Picking-up | *Activate, connect, go to control mode* | | |
| 1120 — ⏻ | Activate, switch on motor, usage mode (control) | Switch on motor, go to usage mode | Switch off motor, control mode |
| 1130 — + | Activate, connect, go to control mode | Move up to next UI element | Increase motor speed to next setting |
| 1140 — − | Activate, connect, go to control mode | Move down to next UI element | Decrease motor speed |
| 1150 — △ | Activate, connect, go to control mode | Change value of selected UI element | Toggle shaving head suspension lock |
| 30 seconds no inputs | — | Go to off | — |

FIG. 11

PERSONAL CARE APPARATUS

CROSS REFERENCE TO RELATED APPLICATIONS

This application is the U.S. National Phase application under 35 U.S.C. § 371 of International Application No. PCT/EP2019/076345 filed Sep. 30, 2019, which claims the benefit of European Patent Application Number 18198663.9 filed Oct. 4, 2018. These applications are hereby incorporated by reference herein.

FIELD OF THE INVENTION

The present disclosure relates to a personal care apparatus for supporting a user in performing a personal care activity, and a method of operating thereof. The present disclosure also relates to a system comprising a personal care apparatus and a display apparatus.

BACKGROUND OF THE INVENTION

A user performing a personal care activity can often benefit from being assisted during the personal care activity. For example, some smart mirrors provide an opportunity to add extra visual information to be displayed in addition to a reflection (or a representation of a scene, if a display is being used to approximate a mirror). This can be useful since people often perform various personal care activities in front of a mirror. For example, personal care activities performed in front of a mirror can include personal health activities (which may be monitored to study the health of the user performing the personal health activity), personal hygiene activities (for example, tooth care activities such as cleaning, brushing, or flossing teeth, or skin care activities such as treating or cleansing skin), and personal grooming activities (for example, removing hair such as cutting hair or shaving hair on any part of their body, or brushing or straightening hair). The visual information provided by smart mirrors can directly enhance and support these personal care activities. Specifically, the user interface provided by the smart mirrors allow an elevated experience of using a respective personal care apparatus (e.g. an electric toothbrush or an electric shaver) which leads to improved user-friendliness of the personal care apparatus. This kind of visual information can additionally or alternatively be provided by other types of display apparatuses, such as those at smartphones or tablet computers.

Smart mirrors are usually installed or mounted over a vanity or a counter top, for example in a bathroom. This placement means that the touch interface of the smart mirror is at some distance from a user, thus making it inconvenient for the user to reach the interface from an ergonomic point of view. In addition, when the user is actively handling a handheld personal care apparatus for performing a personal care activity, they may not be able to conveniently perform touch screen interaction with the smart mirror.

It is to be noted that EP 3 300 866 A1 discloses personal care appliance having a single display unit on which various display screens may be projected and a toggle function to switch between the various display screens. In addition EP 3 300 866 A1 discloses that the personal care device may be docked to a cleaning device, the display screen of the cleaning device being operable using the personal care appliance.

It is further to be noted that US 2012/036657 A1 discloses a toothbrush having sensors to allow the detection of a use mode of the toothbrush and a control unit configured to switch between different settings of the toothbrush depending on the sensor readings.

It is further to be noted that WO 2018/060232 A1 discloses a apparatus and method for supporting at least one user in performing a personal care activity. The apparatus comprising a control unit configured to determine a personal care activity performed by the at least one user, identify one or more regions of interest in the image of the at least one user based on the determined personal care activity, acquire information associated with the determined personal care activity, and modify the image of the at least one user at the identified one or more regions of interest based on the acquired information to support the at least one user in performing the personal care activity.

SUMMARY OF THE INVENTION

As noted above, there are a number of disadvantages associated with the currently available personal care apparatuses for use in conjunction with display apparatuses such as smart mirrors, such as the ergonomic issues associated with the control of the smart mirror in these systems. Moreover, currently available smart mirrors typically include touch interfaces, and fingerprint smudges or stains at the touch interface may detract a user from the personal care activity experience using a personal care apparatus. It would therefore be advantageous to provide an improved personal care apparatus that can be used for remotely controlling a connected display apparatus (such as a smart mirror), and a method of operating thereof.

To better address one or more of the concerns mentioned earlier, in a first aspect, there is provided a personal care apparatus for supporting a user in performing a personal care activity, the personal care apparatus being configured to connect to a display apparatus. The personal care apparatus comprises a first control unit configured to: determine a current operation mode of the personal care apparatus as a usage mode or a control mode; and detect a first predetermined user maneuver, wherein in the usage mode at least one or more user maneuvers of the personal care apparatus correspond to controlling the personal care apparatus itself and wherein in the control mode at least one or more user maneuvers of the personal care apparatus correspond to controlling the display apparatus, wherein the first predetermined user maneuver corresponds to a control operation of the personal care apparatus in the usage mode and corresponds to a control operation of the display apparatus in control mode, wherein when the first predetermined user maneuver is detected, the first control unit is further configured to perform the control operation of the personal care apparatus if the determined current operation mode is the usage mode, or transmit a control signal corresponding to the control operation of the display apparatus to the display apparatus if the determined current operation mode is the control mode such that the user can operate the personal care apparatus so as to remotely control the display apparatus.

In some embodiments, the first control unit may be further configured to: detect a second predetermined user maneuver, wherein the second predetermined user maneuver corresponds to an initiation of an operation mode of the personal care apparatus or a change of operation mode of the personal care apparatus; and determine the current operation mode of the personal care apparatus based on the detected second predetermined user maneuver.

In some embodiments, the second predetermined user maneuver may correspond to an initiation of the control mode, and the first control unit may be further configured to establish, upon detection of the second predetermined user maneuver, a connection with the display apparatus.

In some embodiments, the first control unit may be configured to determine the current operation mode of the personal care apparatus based on whether a connection is established between the personal care apparatus and the display apparatus.

In some embodiments, the personal care apparatus may further comprise an inertial measurement unit configured to detect a change in orientation and/or movement of the personal care apparatus. In these embodiments, the first predetermined user maneuver may be a predetermined change of orientation of the personal care apparatus and/or a predetermined movement of the personal care apparatus.

In some embodiments, the first control unit may be further configured to: determine at least one of a stage of the personal care activity performed by the user and a status of the personal care apparatus; and determine the current operation mode of the personal care apparatus based on at least one of the determined stage of personal care activity and the determined status of the personal care apparatus.

In some embodiments, the first control unit may be configured to determine at least one of a stage of the personal care activity performed by the user and a status of the personal care apparatus based on at least one of measured degree of pressure exerted by the user on at least a part of the personal care apparatus, a measured level of electrical resistance at the personal care apparatus, and a proximity of the personal care apparatus with a body part of the user.

In some embodiments, the personal care apparatus may further comprise a motor unit. In these embodiments, the first control unit may be configured to determine at least one of a stage of the personal care activity performed by the user and a status of the personal care apparatus based on a driving status of the motor unit.

In some embodiments, the control operation of the personal care apparatus may comprise at least one of: switching on the personal care apparatus, switching off the personal care apparatus, changing a performance mode of the personal care apparatus, changing a speed setting of the personal care apparatus, and changing a time setting of the personal care apparatus.

In a second aspect, there is provided a system comprising the personal care apparatus according to the first aspect, and the display apparatus.

In some embodiments, the display apparatus comprises a second control unit configured to: control the display apparatus to output one or more graphical user interface elements; receive a control signal from the personal care apparatus; and changing a value of at least one of the one or more graphical user interface elements based on the received control signal.

In some embodiments, the display apparatus may comprise a second control unit, and at least one of the first control unit and the second control unit is configured to determine at least one of a stage of the personal care activity performed by the user and a status of the personal care apparatus. In these embodiments, the second control unit may be further configured to control the display apparatus based on at least one of the determined stage of personal care activity and the determined status of the personal care apparatus.

In some embodiments, the display apparatus may be a smart mirror.

In a third aspect, there is provided a method of operating a personal care apparatus, wherein the personal care apparatus is configured to connect to a display apparatus. The method comprises: determining a current operation mode of the personal care apparatus as a usage mode or a control mode; and detecting a first predetermined user maneuver. In the usage mode at least one or more user maneuvers of the personal care apparatus correspond to controlling the personal care apparatus itself and in the control mode at least one or more user maneuvers of the personal care apparatus correspond to controlling the display apparatus. The first predetermined user maneuver corresponds to a control operation of the personal care apparatus in the usage mode and corresponds to a control operation of the display apparatus in control mode. When the first predetermined user maneuver is detected, the method further comprises: if the determined current operation mode is the usage mode, performing the control operation of the personal care apparatus, or if the determined current operation mode is the control mode, transmitting a control signal corresponding to the control operation of the display apparatus to the display apparatus such that the user can operate the personal care apparatus so as to remotely control the display apparatus.

In a fourth aspect, there is provided a computer program product comprising a computer readable medium, the computer readable medium having computer readable code embodied therein, the computer readable code being configured such that, on execution by a suitable computer or processor, the computer or processor is caused to perform the method according to the third aspect.

According to the aspects and embodiments described above, the limitations of existing techniques are addressed. In particular, the above-described aspects and embodiments enable a display apparatus (such as a smart mirror) to be remotely controlled using a personal care apparatus in the vicinity of the display apparatus. There is thus provided an improved personal care apparatus and a method of operating thereof. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which:

FIG. 11 is a table illustrating the correspondence between a number of different user maneuvers and a number of control operations during an off status, a control mode, and a usage mode of the personal care apparatus 600 of FIG. 6.

DETAILED DESCRIPTION OF EMBODIMENTS

As noted above, there is provided an improved personal care apparatus and a method of operating the same which addresses the existing problems.

Figure 1:
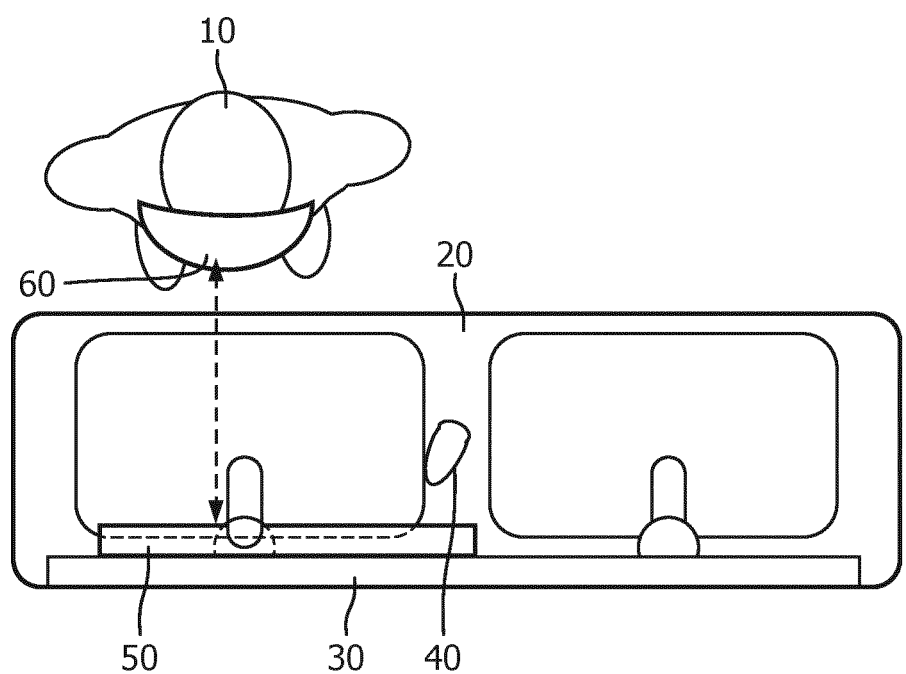
FIG. 1 is a top-view schematic diagram illustrating a typical smart mirror and personal care apparatus set-up in a bathroom.
Figure 2C:
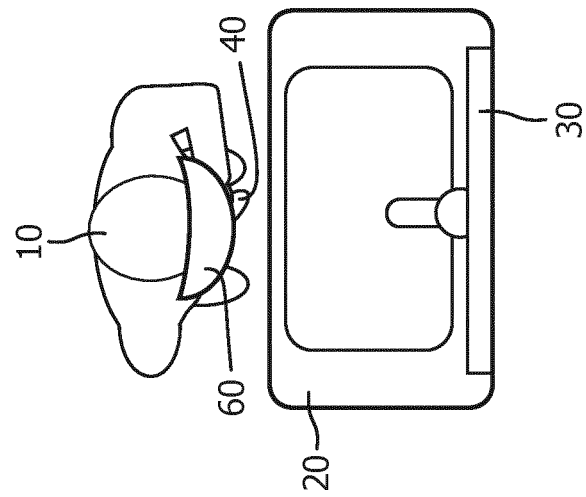
FIGS. 2A to 2C are top-view schematic diagrams illustrating user interaction with the smart mirror and personal care apparatus set-up of FIG. 1, before and during use of a personal care apparatus.
Figure 2B:
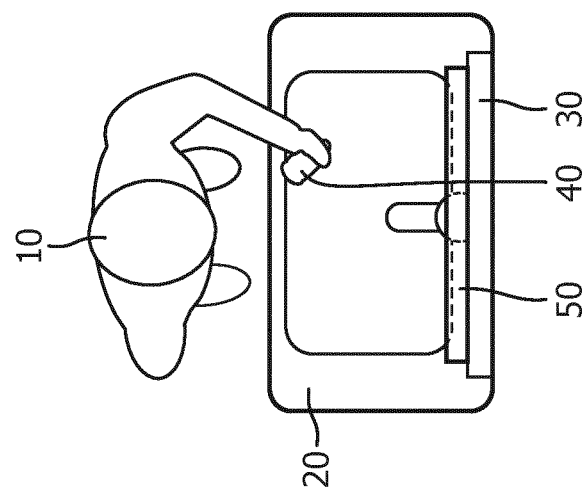
Figure 2A:
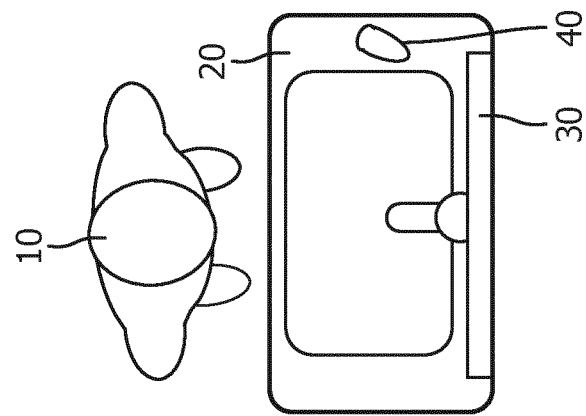

FIG. 1 is a top-view schematic diagram illustrating a typical smart mirror and personal care apparatus set-up in a bathroom, and FIGS. 2A to 2C are diagrams illustrating user interaction with the smart mirror and personal care apparatus set-up of FIG. 1, before and during use of a personal care apparatus. In all of FIGS. 1 and 2A to 2C, it is shown that the set-up comprises a user 10, a bathroom vanity 20, a smart mirror 30, and a personal care apparatus 40. The set-up as illustrated in FIGS. 2A and 2C can be regarded as a simplified version of that as shown in FIG. 1, where only a side of the bathroom vanity 20 proximate to the user 10 is shown, or it can be regarded as a different single-sink bathroom vanity.

Typically, during use of the personal care apparatus 40 (e.g. an electric shaver) in conjunction with a smart mirror 30, the user 10 is positioned in front of the smart mirror 30 which is mounted above the bathroom vanity 20 so that they can monitor a progress of the personal care activity by way of reflection of the smart mirror 30. The smart mirror 30 as shown in FIG. 1 and FIGS. 2A to 2C, like many smart mirrors 30 currently known, provides a touch screen user interface to allow the user 10 to interact with the smart mirror 30. In particular, the user 10 can access a plurality of applications installed at the smart mirror 30 via the touch screen user interface. The plurality of applications available at the smart mirror 30 may include application(s) associated with the personal care apparatus, such as those for performing control of the personal care apparatus and/or for providing personal care activity routine assistance, and/or other types of general purpose or informative application(s) (e.g. a weather application).

The area associated with the interaction between the user 10 and the smart mirror 30 is shown in FIG. 1 and FIG. 2B as the smart mirror interaction area 50. Also, the area associated with the interaction between the user 10 and the personal care apparatus 40 is shown in FIG. 1 as the personal care activity area 60. It can be seen from FIG. 1 that due to the respective positions of the smart mirror 30, the bathroom vanity 20, and the user 10, there is a considerable distance between the smart mirror interaction area 50 and the personal care activity area 60. This distance may cause potential issues from an ergonomic point of view. For example, the user 10 may need to reach over the bathroom vanity 20 to access the touch screen of the smart mirror 30. Furthermore, when the user 10 is holding the personal care apparatus 40, it may not be convenient for them to interact with the touch screen user interface of the smart mirror 30.

By using the personal care apparatus and/or the system as described according to the present disclosure, the potential problems arising from the distance between the smart mirror interaction area 50 and the personal care activity area 60 can be circumvented. In more detail, the personal care apparatus as described according to the present disclosure allows a user to operate the personal care apparatus so as to remotely control the smart mirror (or other types of display apparatuses), thus removing the need for the user to perform movements that compromise comfort or convenience.

Figure 3:
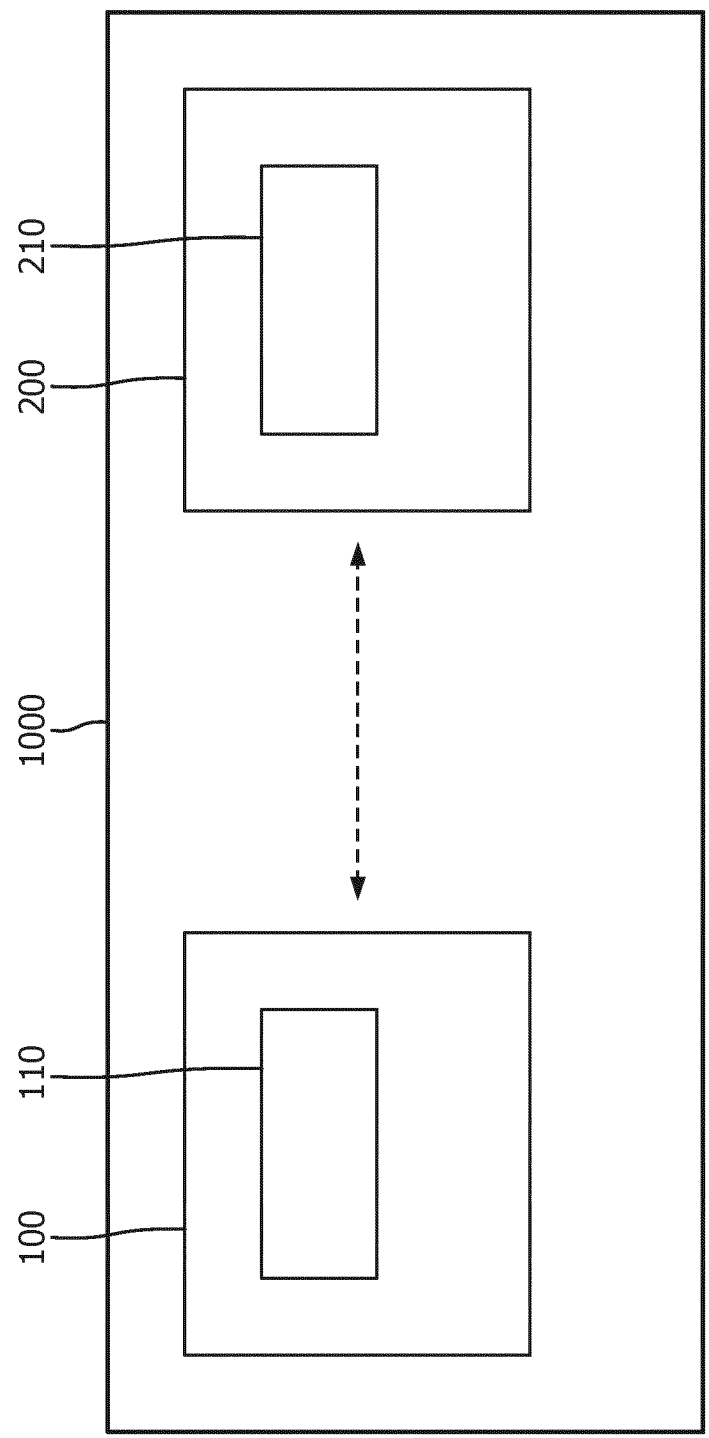
FIG. 3 is a block diagram of a system comprising a personal care apparatus and a display apparatus, according to an embodiment.

FIG. 3 shows a block diagram of a system 1000 according to an embodiment, which comprises a personal care apparatus 100 and a display apparatus 200. The personal care apparatus 100 can be used for supporting at least one user in performing a personal care activity, and can be connected to the display apparatus 200 via a wired or wireless connection (e.g. Bluetooth). In some embodiments, the display apparatus 200 may be a smart mirror. In other embodiments, the display apparatus 200 may be a part of another device, such as a smartphone or a tablet computer.

The personal care activity may comprise a personal health activity (for example, a skin assessment such as an optical skin assessment, a physiological condition assessment such as a heart rate assessment or a blood-pressure assessment, a glucose assessment, a body shape assessment such as an optical body shape assessment, a physical flexibility assessment, a wound assessment, or any other personal health activity), a personal hygiene activity (for example, tooth care activities such as cleaning, brushing, or flossing teeth, skin care activities such as treating or cleansing skin, or any other personal hygiene activity), a personal grooming activity (for example, removing hair such as cutting or shaving hair on any part of the body, or brushing, curling, or straightening hair), or any other personal care activity. Thus, the personal care apparatus may be one of: an electric toothbrush, an electric shaver, an electric epilator, an electric facial cleansing brush, eye energizer, a hair curling iron, a hair straightener, a sphygmomanometer, etc.

As illustrated in FIG. 3, the personal care apparatus comprises a first control unit 110 that controls the operation of the personal care apparatus 100 and that can implement the method described herein. The first control unit 110 can comprise one or more processors, processing units, multi-core processor or modules that are configured or programmed to control the personal care apparatus 100 in the manner described herein. In particular implementations, the first control unit 110 can comprise a plurality of software and/or hardware modules that are each configured to perform, or are for performing, individual or multiple steps of the method described herein.

The first control unit 110 is configured to determine a current operation mode as a usage mode or a control mode. In the usage mode, at least one or more user maneuvers of the personal care apparatus 100 correspond to controlling the personal care apparatus 100 itself; and in the control mode, at least one or more user maneuvers of the personal care apparatus 100 correspond to controlling the display apparatus 200. Thus, a particular user maneuver (e.g. pressing a certain button at the personal care apparatus 100) may correspond to at least two different control operations depending on the current operation mode of the personal care apparatus 100, i.e. whether it is the usage mode or the control mode.

The first control unit 110 is also configured to detect a first predetermined user maneuver, e.g. a long-actuation of a certain button at the personal care apparatus 100 or a double-actuation of a certain button at the personal care apparatus 100. The first predetermined user maneuver corresponds to a control operation of the personal care apparatus 100 in the usage mode and corresponds to a control operation of the display apparatus 200 in the control mode. In some embodiments, the control operation of the personal care apparatus 100 may comprise at least one of: switching on the personal care apparatus 100 switching off the personal care apparatus 100, changing a performance mode of the personal care apparatus 100, changing a speed setting of the personal care apparatus 100, and changing a time setting of the personal care apparatus 100.

When the first predetermined user maneuver is detected by the first control unit 110, the first control unit 110 is further configured to perform the control operation of the personal care apparatus if the determined current operation mode is the usage mode, or transmit a control signal corresponding to the control operation of the display apparatus 200 to the display apparatus 200 if the determined current operation mode is the control mode.

In some embodiments, the first control unit 110 may be further configured to detect a second predetermined user maneuver. The second predetermined user maneuver in this case corresponds to an initiation of an operation mode of the personal care apparatus 100 or a change of operation mode of the personal care apparatus 100. For example, the second predetermined user maneuver may be a change of orientation and/or movement of the personal care apparatus 100 corresponding to the personal care apparatus 100 being picked up by the user from a stationary position. Thus, in this particular example, when the user picks up the personal care apparatus 100 from a surface of the bathroom vanity, the first control unit 110 may be configured to detect this movement as the second predetermined user maneuver and to initiate the usage mode or the control mode.

As another example, the second predetermined user maneuver may be a manipulation of a user interface of the display apparatus 200. Thus, in this particular example, when the user manipulates the user interface of the display apparatus 200 (e.g. by tapping the touch screen of the display apparatus 200), the first control unit 110 may be configured to detect this interaction, via an established connection between the personal care apparatus 100 and the display apparatus 200, as the second predetermined user maneuver, and to initiate the usage mode or the control mode.

In some embodiments, the second predetermined user maneuver may specifically correspond to an initiation of the control mode. In these embodiments, the first control unit 110 may be configured to establish, upon detection of the second predetermined user maneuver, a connection with the display apparatus 200. Therefore, in these embodiments, the user can remotely control the display apparatus 200 using the personal care apparatus 100 once they have performed the designated user maneuver for initiating the control mode, without having to perform additional user maneuvers for establishing the connection between the personal care apparatus 100 and the display apparatus 200.

In some embodiments, the first control unit 110 may be configured to determine the current operation mode of the personal care apparatus 100 based on whether a connection is established between the personal care apparatus 100 and the display apparatus 200. The first control unit 110 may be configured to establish this connection automatically when the personal care apparatus 100 is switched on and when it is detected that the personal care apparatus 100 is within the vicinity of the display apparatus 200. As an example, the first control unit 110 may be configured to determine that the current operation mode of the personal care apparatus 100 is the control mode if there is an established connection between the personal care apparatus 100 and the display apparatus 200. Therefore, in these embodiments, the user can remotely control the display apparatus 200 using the personal care apparatus 100 once there is an established connection between the personal care apparatus 100 and the display apparatus 200, without having to perform additional user maneuvers to initiate the control mode of the personal care apparatus 100.

Moreover, in some embodiments, the first control unit 110 may be configured to change the current operation mode based on whether there is an established connection between the personal care apparatus 100 and the display apparatus 200.

Although not shown in FIG. 3, in some embodiments the personal care apparatus 100 may further comprise an inertial measurement unit configured to detect a change in orientation and/or movement of the personal care apparatus 100. The inertial measurement unit may comprise at least one of: an accelerometer configured to detect an acceleration of the personal care apparatus 100, a motion sensing unit configured to detect motion/rotation of the personal care apparatus 100, a vibration sensing unit configured to detect a user-induced vibration of the personal care apparatus 100, and a barometer configured to detect a relative height of the personal care apparatus 100. Therefore, the inertial measurement unit may be configured to detect a change in orientation and/or movement of the personal care apparatus 100 based on measurement(s) of one or more of the accelerometer, the motion sensing unit, the vibration sensing unit, and the barometer. In these embodiments, the first predetermined user maneuver may be a predetermined change of orientation of the personal care apparatus 100 and/or a predetermined movement of the personal care apparatus 100 as detected by the inertial measurement unit.

For example, the control unit 110 may be configured to detect a user picking up the personal care apparatus 100 from a stationary position as the first predetermined user maneuver. In this example, the movement of the personal care apparatus 100 from the stationary position may be measured by the barometer of the inertial measurement unit, e.g. when the personal care apparatus 100 has been raised by more than 25 cm. Subsequently, the first control unit 110 may determine that the first predetermined user maneuver is being performed or has been performed by the user based on the measurement(s) of the inertial measurement unit.

In some embodiments, the first control unit 110 may be further configured to determine at least one of a stage of the personal care activity performed by the user and a status of the personal care apparatus 100, and to determine the current operation mode of the personal care apparatus 100 based on at least one of the determined stage of personal care activity and the determined status of the personal care apparatus 100.

For example, the personal care apparatus 100 may be an electric hair clipper and the first control unit 110 of the personal care apparatus 100 may be configured to determine, based on an amount of elapsed time since the personal care apparatus 100 has been switched on, that the user has started the personal care activity (i.e. hair clipping). Based on this determined stage of personal care activity, the first control unit 110 may be configured to determine that the current operation mode is the usage mode, since in this example at an early stage of a personal care activity the user would be likely to wish to perform control operation(s) of the personal care apparatus 100 itself, rather than control operations of the display apparatus 200.

As another example, the personal care apparatus 100 may be a skin cleansing apparatus which comprises a skin hydration sensing unit configured to detect a level of skin hydration of a user. In this example, the first control unit 100 of the personal care apparatus 100 may be configured to determine, based on an amount of elapsed time since the personal care apparatus 100 has been switched on, that the user has started the personal care activity (i.e. skin cleansing). Based on this determined stage of personal care activity, the first control unit 110 may be configured to determine that the current operation mode is the control mode, since in this example the user is likely to have already performed adjustment of the settings of the personal care apparatus 100 before the start of the personal care activity, and that while the user is performing the personal care activity they may wish to perform control operation(s) of the display apparatus 200 to review information relevant to the personal care activity displayed at the display apparatus 200, such as a real-time change in levels of skin hydration of the user as detected by the skin hydration sensing unit at the personal care apparatus 100, and/or historical data relevant to the skin cleansing activity, and/or analysis data relevant to the personal care activity.

Although not shown in FIG. 3, in some embodiments the personal care apparatus 100 may further comprise at least one of: a pressure sensing unit configured to measure a degree of pressure exerted by the user on at least a part of the personal care apparatus 100, an electrical resistance sensing unit configured to measure a level of electrical resistance at the personal care apparatus 100, and a proximity sensing unit to measure a proximity of the personal care apparatus 100 with a body part of the user. In these embodiments, the first control unit 110 may be configured to determine at least one of a stage of the personal care activity performed by the user and a status of the personal care apparatus 100 based on the at least one of: a measured degree of pressure exerted by the user on at least a part of the personal care apparatus, a measured level of electrical resistance at the personal care apparatus, and a proximity of the personal care apparatus with a body part of the user.

For example, in some embodiments the personal care apparatus 100 may be a skin cleansing apparatus comprising a head portion at which the pressure sensing unit is located. In this example, the first control unit 110 may be configured to determine that the user has started the personal care activity (i.e. skin cleansing) when it detects that the degree of pressure exerted by the user on the head portion is higher than a predetermined threshold. Based on this determination, the first control unit 110 may be configured to determine that the user has started the personal care activity (i.e. skin cleansing). Subsequently, based on this determined stage of personal care activity, the first control unit 110 may be configured to determine that the current operation mode is the usage mode, since at an early stage of a personal care activity the user would be likely to wish to perform control operation(s) of the personal care apparatus 100 itself, rather than control operations of the display apparatus 200.

As another example, in some embodiments the personal care apparatus 100 may be an electric shaver comprising a shaver head portion at which the proximity sensing unit is located. In this example, the first control unit 110 may be configured to determine that the user has started the personal care activity (e.g. shaving) when it detects that the shaver head portion is in contact with the face of the user. Based on this determination, the first control unit 110 may be configured to determine that the user has started the personal care activity (i.e. shaving). Subsequently, based on this determined stage of personal care activity, the first control unit 110 may be configured determine that the current operation mode is the usage mode, since at an early stage of a personal care activity the user would be likely to wish to perform control operation(s) of the personal care apparatus 100 itself, rather than control operations of the display apparatus 200.

Although not shown in FIG. 3, in some embodiments the personal care apparatus 100 may further comprise a motor unit. In these embodiments, the first control unit 110 may be configured to determine at least one of a stage of the personal care activity and a status of the personal care apparatus 100 based on a driving status of the motor unit.

As illustrated in FIG. 3, the display apparatus 200 comprises a second control unit 210 that controls the operation of the display apparatus 200 and that can implement at least a part of the method described herein. Similar to the first control unit 110 of the personal care apparatus 100, the second control unit 210 can comprise one or more processors, processing units, multi-core processor or modules that are configured or programmed to control the display apparatus 200 in the manner described herein. In particular implementations, the second control unit 210 can comprise a plurality of software and/or hardware modules that are each configured to perform, or are for performing, individual or multiple steps of the method described herein.

The second control unit 210 is configured to receive a control signal from the personal care apparatus 100, for example a control signal corresponding to a control operation of the display apparatus 200 that is transmitted from the personal care apparatus 100 upon detection of the first predetermined user maneuver during the control mode of the personal care apparatus 100.

In some embodiments, the second control unit 210 may be configured to control the display apparatus 200 to output one or more graphical user interface elements. In these embodiments, a control operation of the display apparatus 200 may be to change a value of at least one of the one or more graphical user interface elements, such as toggling a selection at the display apparatus 200. The second control unit 210 in these embodiments may therefore be configured to change a value of at least one of the one or more graphical user interface elements based on the control signal.

In some embodiments, at least one of the first control unit 110 and the second control unit 210 may be configured to determine at least one of a stage of the personal care activity performed by the user and a status of the personal care apparatus 100. In these embodiments, the second control unit 210 may be further configured to control the display apparatus 200 based on at least one of the determined stage of personal care activity and the determined status of the personal care apparatus 100.

Although not shown in the drawing, at least one of the personal care apparatus 100 and the display apparatus 200 may further comprise at least one user interface. A user interface may be for use in providing a user of the personal care apparatus 100 and/or the display apparatus 200 with visual information relating to a personal care activity that is supported by the personal care apparatus 100, and/or visual information relating to the personal care apparatus 100, and/or visual information relating to a current operation mode of the personal care apparatus 100 (i.e. whether the personal care apparatus 100 is in the usage mode or the control mode).

For example, a user interface in the form of a 3-LED indicator bar or a display screen may be provided at the personal care apparatus 100 for indicating a level of battery of the personal care apparatus 100 and/or a number of uses of the personal care apparatus 100. As another example, a current speed of a motor unit of a personal care apparatus 100 may be displayed at a user interface of the personal care apparatus 100 and/or a user interface of the display apparatus 200. Alternatively or in addition, a user interface may be configured to receive a user input. For example, a user interface may allow a user of the personal care apparatus 100 and/or the display apparatus 200 to manually enter instructions, data, or information. In these embodiments, the first control unit 110 and/or the second control unit 210 may be configured to acquire the user input from one or more user interfaces.

A user interface may be any user interface that enables the rendering (or output or display) of information to a user of the personal care apparatus 100 and/or the display apparatus 200. Alternatively or in addition, a user interface may be any user interface that enables a user of the personal care apparatus 100 and/or the display apparatus 200 to provide a user input, interact with and/or control the personal care apparatus 100 and/or the apparatus 200. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback, or any other user interface, or combination of user interfaces. In some embodiments, the first predetermined user maneuver and/or the second predetermined user maneuver may be a user manipulation of a user interface of the personal care apparatus 100, such as actuating a switch, a button, a keypad, a keyboard, or a touch screen.

In some embodiments, at least one of the personal care apparatus 100 and the display apparatus 200 may comprise a memory. Alternatively or in addition, one or more memories may be external to (i.e. separate to or remote from) the personal care apparatus 100 or the display apparatus 200. For example, one or more memories may be part of another device. A memory can be configured to store program code that can be executed by the first control unit 110 and/or the second control unit 210 to perform the method described herein. A memory can be used to store information, data, signals and measurements acquired or made by the first control unit 110 and/or the second control unit 210.

In some embodiments, at least one of the personal care apparatus 100 and the display apparatus 200 may comprise a communications interface (or circuitry) for enabling the personal care apparatus 100 and/or the display apparatus 200 to communicate with any interfaces, memories and/or devices that are internal or external to the apparatuses. The communications interface may communicate with any interfaces, memories and/or devices wirelessly or via a wired connection. For example, the communications interface of the personal care apparatus 100 may communicate with the communications interface of the display apparatus 200 wirelessly or via a wired connection. Similarly, the communications interface may communicate with the one or more memories wirelessly or via a wired connection. Therefore, there may be provided a datalink between the personal care apparatus 100 and the display apparatus 200. In some embodiments, the data link may be implemented as a Bluetooth connection with proprietary data protocol. In alternative embodiments, the datalink may be wired electrically or wireless electrically with radio frequency. Also, in some embodiments, the datalink may be wired or wireless with light, visible or infrared, or it may be acoustic. The datalink and protocol used may include Wi-Fi, DECT, ZigBee, SIRCS, IrDA, Morse code, near-field communication (NFC), etc. In addition, the datalink connection between the personal care apparatus 100 and the display apparatus 200 may be simplex, duplex or half-duplex.

It will be appreciated that FIG. 3 only shows the components required to illustrate an aspect of the system 1000, the personal care apparatus 100, and the display apparatus 200, and in a practical implementation, the system 1000, the personal care apparatus 100, or the display apparatus 200 may comprise alternative or additional components to those shown. For example, the personal care apparatus 100 may comprise a battery or other power supply for powering the personal care apparatus 100 or means for connecting the personal care apparatus 100 to a mains power supply. Similarly, the display apparatus 200 may comprise a battery or other power supply for powering the personal care apparatus 200 or means for connecting the personal care apparatus 200 to a mains power supply.

Figure 4:
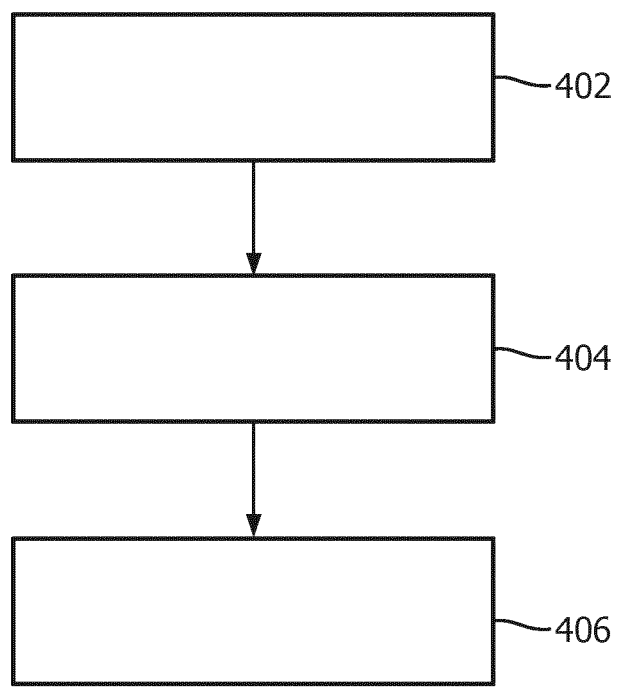
FIG. 4 is illustrates a method of operating the personal care apparatus of FIG. 3, according to an embodiment.

FIG. 4 illustrates a computer-implemented method of operating the personal care apparatus of FIG. 3, according to an embodiment. The illustrated method can generally be performed by or under the control of the first control unit 110 of the personal care apparatus 100. In some embodiments, as will be explained in more detail in the following, at least a part of the illustrated method can be additionally or alternatively performed or under the control of the second control unit 210 of the display apparatus 200 as shown in FIG. 3.

With reference to FIG. 4, at block 402, a current operation mode of the personal care apparatus 100 is determined as a usage mode or a control mode. More specifically, the current operation mode is determined by the first control unit 110 of the personal care apparatus 100. As mentioned above with reference to FIG. 3, in the usage mode, at least one or more user maneuvers of the personal care apparatus 100 correspond to controlling the personal care apparatus 100 itself; in the control mode, at least one or more user maneuvers of the personal care apparatus 100 correspond to controlling the display apparatus 200.

In some embodiments, determining the current operation mode of the personal care apparatus 100 at block 402 may be based on detected second predetermined user maneuver which corresponds to an initiation of an operation mode of the personal care apparatus 100. In these embodiments, the method may further comprise detecting the second predetermined user maneuver. Furthermore, in some of these embodiments, the second predetermined user maneuver may correspond to an initiation of the control mode, and the method may further comprise establishing a connection with the display apparatus upon detection of the second predetermined user maneuver by the first control unit 110. Alternatively, the method may further comprise determining the current operation mode of the personal care apparatus 100 based on whether a connection is established between the personal care apparatus 100 and the display apparatus 200.

As discussed above with reference to FIG. 3 above, in some embodiments the personal care apparatus 100 may comprise an inertial measurement unit configured to detect a change in orientation and/or movement of the personal care apparatus 100, and the first predetermined user maneuver may be a predetermined change of orientation of the personal care apparatus and/or a predetermined movement of the personal care apparatus 100. In these embodiments, determining the current operation mode of the personal care apparatus 100 at block 402 may comprise determining the predetermined change of orientation and/or the predetermined movement of the personal care apparatus 100 as the first predetermined user maneuver.

In some embodiments, determining the current operation mode of the personal care apparatus may comprise determining at least one of a stage of the personal care activity performed by the user and a status of the personal care apparatus 100, and determining the current operation mode of the personal care apparatus 100 based on at least one of the determined stage of personal care activity and the determined status of the personal care apparatus 100. In some of these embodiments, the method may further comprise at least one of: measuring a degree of pressure exerted by the user on at least a part of the personal care apparatus 100, measuring a level of electrical resistance at the personal care apparatus 100, and measuring a proximity of the personal care apparatus 100 with a body part of the user. Thus, the step of determining at least one of a stage of the personal care activity performed by the user and a status of the personal care apparatus 100 may be based on at least one of: the measured degree of pressure, the measured level of electrical resistance at the personal care apparatus, and a proximity of the personal care apparatus with a body part of the user. Also, as discussed above with reference to FIG. 3, in some embodiments the personal care apparatus 100 may comprise a motor unit. In these embodiments, the step of determining at least one of a stage of the personal care activity performed by the user and a status of the personal care apparatus 100 may be based on a driving status of the motor unit.

Returning to FIG. 4, at block 404, a first predetermined user maneuver is detected by the first control unit 110 of the personal care apparatus 100. The first predetermined user maneuver corresponds to a control operation of the personal care apparatus 100 in the usage mode and corresponds to a control operation of the display apparatus 200 in the control mode. Then, subsequent to the detection of the first predetermined user maneuver at block 404, at block 406, the first control unit 110 is configured to perform the control operation of the personal care apparatus if the current operation mode determined at block 402 is the usage mode, or transmit a control signal corresponding to the control operation of the display apparatus 200 to the display apparatus 200 if the current operation mode determined at block 402 is the control mode.

Although not shown in FIG. 4, in some embodiments the method may further comprise controlling the display apparatus 200 to output one or more graphical user interface elements, receiving a control signal from the personal care apparatus 100, and changing a value of at least one of the one or more graphical user interface elements based on the received control signal. These method steps may be performed by the second control unit 210 of the display apparatus 200. In these embodiments, the change in value of the graphical user interface element(s) may be accompanied by a change in setting/value of the personal care apparatus 100. For example, the control signal received from the personal care apparatus 100 may correspond to a change in speed of a motor unit at the personal care apparatus 100. In this example, this control signal may trigger a change of value of a graphical user interface element that indicates a current speed setting of the motor unit at the personal care apparatus 100, in addition to a change in speed of the motor unit at the personal care apparatus 100.

In addition, although not shown in FIG. 4, in some embodiments the method may further comprise determining at least one of the user and a status of the personal care apparatus. This method step may be performed by at least one of the first control unit 110 and the second control unit 210. Moreover, the method may further comprise controlling the display apparatus 200 based on at least one of the determined stage of personal care activity and the determined status of the personal care apparatus 100. This method step may be performed by the second control unit 210 of the display apparatus 200.

FIGS. 5 to 8 are perspective views of personal care apparatuses according to four different embodiments. The personal care apparatuses as shown in FIGS. 5 to 8 are examples of practical implementations of the personal care apparatus 100 as shown in FIG. 3. In more detail, the personal care apparatuses 500, 600, 700, and 800 are electric shavers configured to be connectable to a display apparatus, e.g. a smart mirror.

Figure 5:
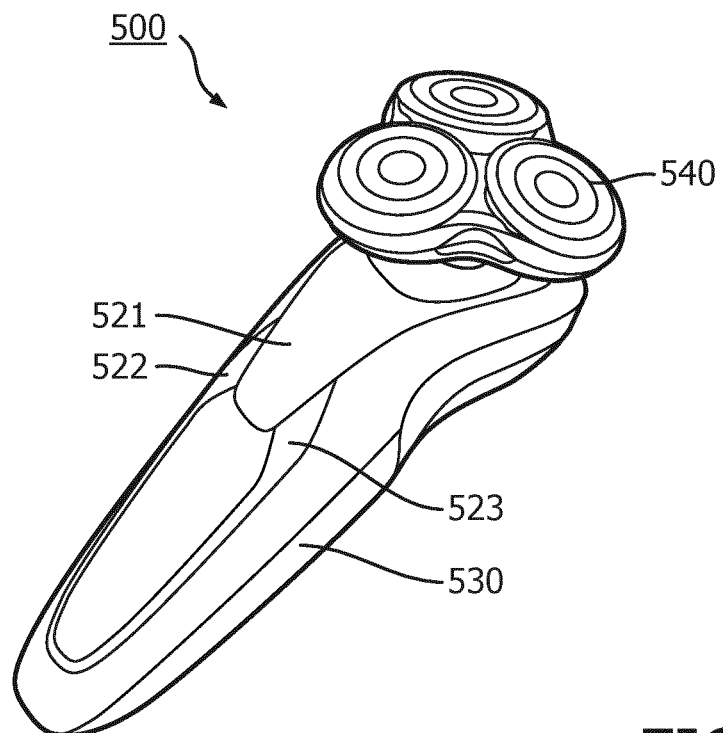
FIG. 5 is a perspective view of a personal care apparatus according to an embodiment.

As shown in FIG. 5, the personal care apparatus 500 comprises a handle portion 530 and a head portion 540, the head portion 540 comprising a plurality of cutting units which are configured to be driven by a motor unit (not shown in the drawing). At the handle portion 530, there is provided a first button 521, a second button 522, and a third button 523. In the present embodiment, actuation of the first button 521 corresponds to switching on or switching off the personal care apparatus 500, depending on a current on/off status of the personal care apparatus 500. Furthermore, the personal care apparatus 500 of this embodiment is configured such that a movement of the personal care apparatus 500 corresponding to a user shaking/moving the personal care apparatus is detected as the second predetermined user maneuver by the first control unit (not shown in the drawing), wherein the second predetermined user maneuver corresponds to a change of operation mode of the personal care apparatus 500. Therefore, when the user shakes the personal care apparatus 500, the current operation mode is changed from the usage mode to the control mode, or vice versa.

Moreover, in this embodiment, actuation of the second button 522 and the third button 523 respectively correspond to different control operations of either the personal care apparatus 500 itself or a connected display apparatus, depending on the current operation mode of the personal care apparatus 500. Specifically, in the present embodiment, actuation of the second button 522 in the usage mode corresponds to the control operation of reducing a vibration speed of the cutting units at the head portion 540 while actuation of the third button 523 during the usage mode corresponds to the control operation of increasing a vibration speed of the cutting units at the head portion 540. Also, actuation of the second button 522 in the control mode corresponds to the control operation of moving up a selection of a graphic interface element at a display apparatus while actuation of the third button 523 in the control mode corresponds to the control operation of moving down a selection of a graphic interface element at the display apparatus. As discussed with reference to FIG. 3 above, control signals corresponding to the control operations of the display apparatus may be transmitted to the display apparatus via the connection between the personal care apparatus 500 and the display apparatus.

Figure 6:
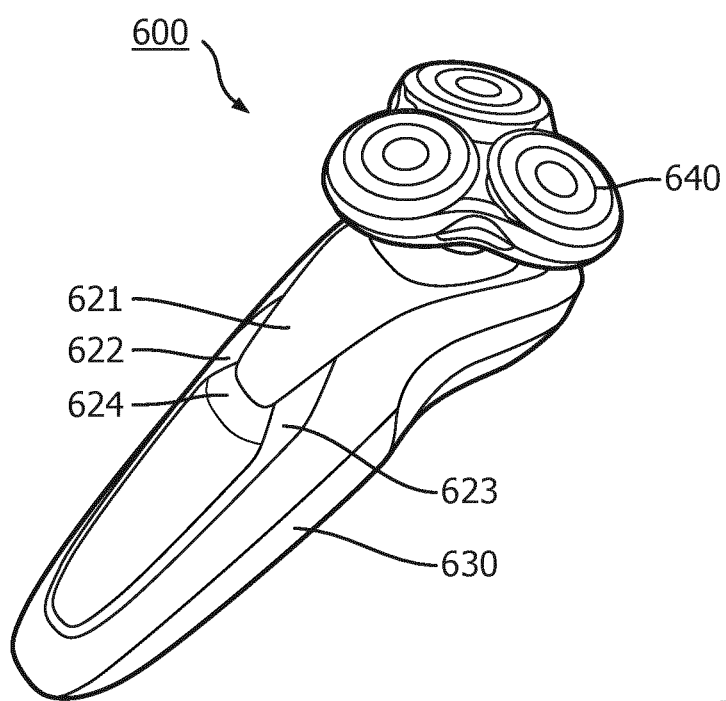
FIG. 6 is a perspective view of a personal care apparatus according to another embodiment.

The personal care apparatus 600 of FIG. 6 is similar to the personal care apparatus 500 as shown in FIG. 5 in that the personal care apparatus 600 also comprises a handle portion 630 and a head portion 640, the head portion 640 comprising a plurality of cutting units which are configured to be driven by a motor unit (not shown in the drawing). The personal care apparatus 600 of FIG. 6 differs from that of FIG. 5 in that at the handle portion 630 of the personal care apparatus 600 of FIG. 6, there is provided a first button 621, a second button 622, a third button 623, and a fourth button 623.

Figure 9:
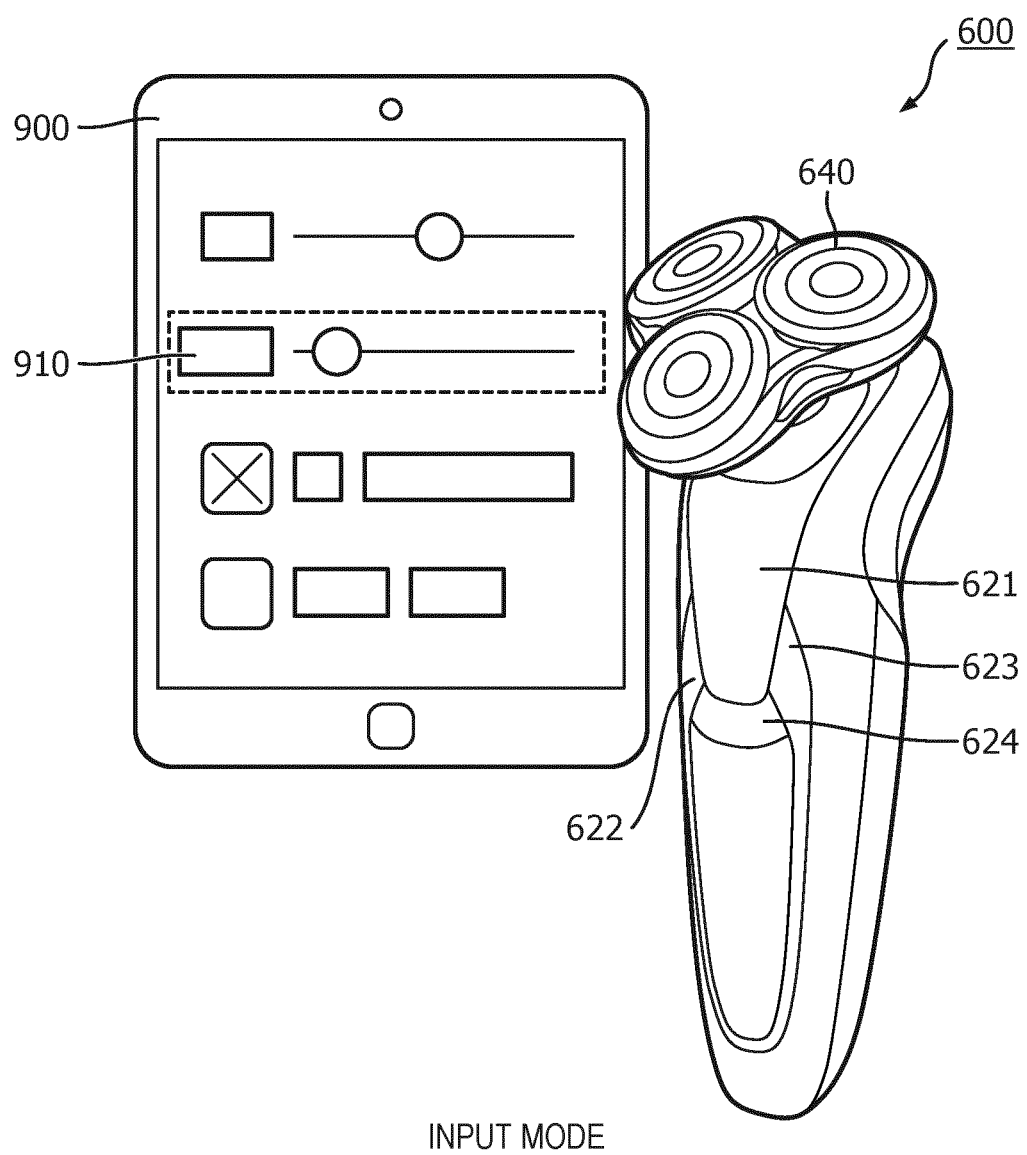
FIG. 9 is a system comprising the personal care apparatus of FIG. 6 and a display apparatus, according to an embodiment.

As mentioned above, the personal care apparatus 600 of the present embodiment is an electric shaver configured to be connectable to a display apparatus. An exemplary embodiment of such display apparatus is shown in FIG. 9, which illustrates a system comprising the personal care apparatus 600 of FIG. 6 and a display apparatus 900 to which the personal care apparatus 600 can be connected. The display apparatus 900 is a tablet computer configured to display a plurality of graphical user interface elements, one of which is highlighted as a selection and labelled as 910.

In the present embodiment, actuation of the first button 621 corresponds to switching on or switching off the personal care apparatus 600, depending on the current on/off status of the personal care apparatus 600. Furthermore, the personal care apparatus 600 of this embodiment is configured such that actuation of the fourth button 624 is detected as the second predetermined user maneuver by the first control unit (not shown in the drawing), wherein the second predetermined user maneuver corresponds to a change of operation mode of the personal care apparatus 600. Hence, the fourth button 624 in this embodiment can be regarded as the "mode" button at the personal care apparatus 600. When the user actuates the fourth button 624, the current operation mode is changed from the usage mode to the control mode, or vice versa.

The operation of the second button 622 and the third button 623 of this embodiment is similar to that of the second button 522 and the third button 523 of the embodiment of FIG. 5. Specifically, in the present embodiment, actuation of the second button 622 in the usage mode corresponds to the control operation of reducing a vibration speed of the cutting units at the head portion 640 while actuation of the third button 623 during the usage mode corresponds to the control operation of increasing a vibration speed of the cutting units at the head portion 640. Also, actuation of the second button 622 in the control mode corresponds to the control operation of moving up a selection of a graphic interface element 910 at the display apparatus 900 while actuation of the third button 623 in the control mode corresponds to the control operation of moving down a selection of a graphic interface element 910 at the display apparatus 900. As discussed with reference to FIG. 3 above, control signals corresponding to the control operations of the display apparatus 900 may be transmitted to the display apparatus 900 via the connection between the personal care apparatus 600 and the display apparatus 900.

Figure 7:
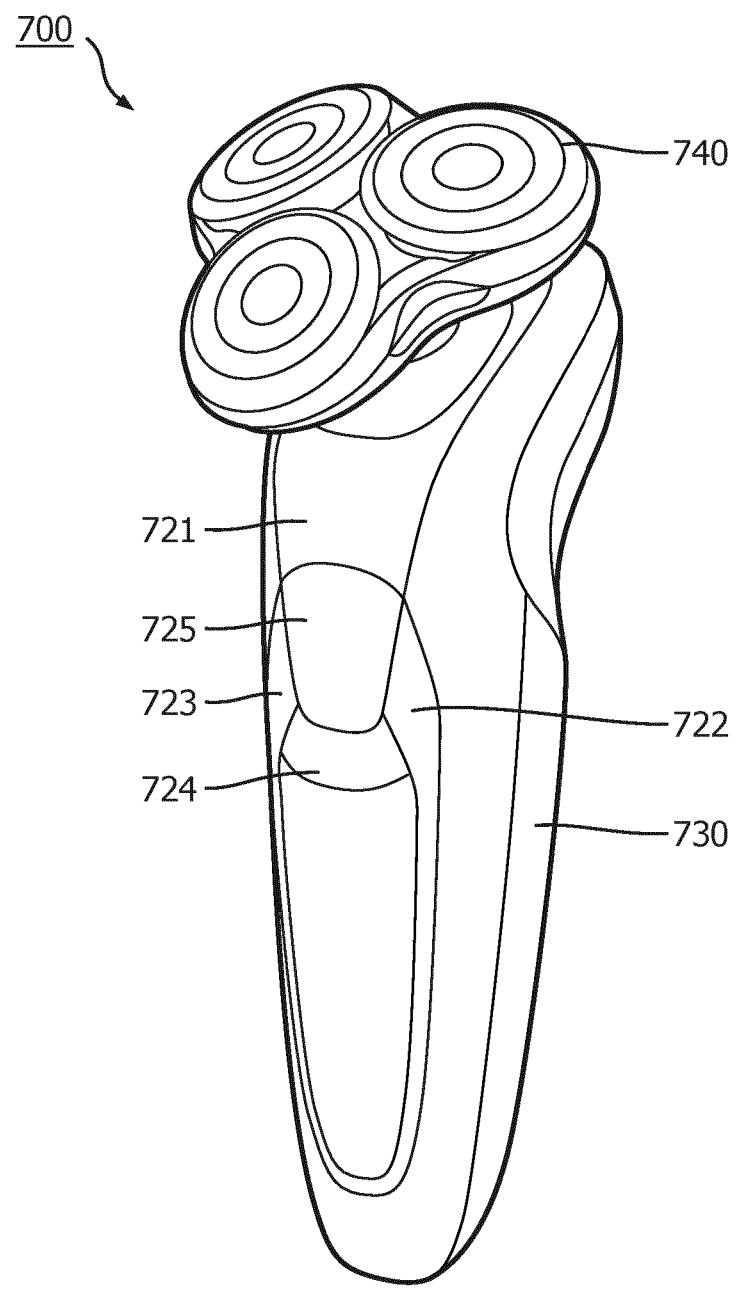
FIG. 7 is a perspective view of a personal care apparatus according to another embodiment.

The personal care apparatus 700 of FIG. 7 is also similar to the personal care apparatus 500 as shown in FIG. 5 in that the personal care apparatus 700 also comprises a handle portion 730 and a head portion 740, the head portion 740 comprising a plurality of cutting units which are configured to be driven by a motor unit (not shown in the drawing). The personal care apparatus 700 of FIG. 7 differs from that of FIG. 5 in that at the handle portion 730 of the personal care apparatus 700 of FIG. 7, there is provided a first button 721, a second button 722, a third button 723, a fourth button 724, and a fifth button 725. In the present embodiment, actuation of the fifth button 725 corresponds to switching on or switching off the personal care apparatus 700, depending on the current on/off status of the personal care apparatus 700. Furthermore, the personal care apparatus 700 of this embodiment is configured such that a movement of the personal care apparatus 700 corresponding to a user shaking (or moving, tilting, jerking, etc.) the personal care apparatus is detected as the second predetermined user maneuver by the first control unit (not shown in the drawing), wherein the second predetermined user maneuver corresponds to a change of operation mode of the personal care apparatus 700. Therefore, when the user shakes the personal care apparatus 700, the current operation mode is changed from the usage mode to the control mode, or vice versa.

Moreover, in this embodiment, actuation of the first to fourth buttons 721, 722, 723, 724 respectively correspond to different control operations of either the personal care apparatus 700 itself or a connected display apparatus, depending on the current operation mode of the personal care apparatus 700. Specifically, in the present embodiment, actuation of the first button 721 in the usage mode corresponds to the control operation of increasing a vibration/rotation speed of the cutting units at the head portion 740, and actuation of the fourth button 724 during the usage mode corresponds to the control operation of reducing a vibration/rotation speed of the cutting units at the head portion 740. Also, actuation of the second button 722 in the usage mode corresponds to the control operation of changing to a next performance mode (e.g. normal mode, sensitive mode, turbo mode, etc., where each of these performance modes correspond to a different amplitude swing of the movement of the plurality of cutting units at the head portion 740), and actuation of the third button 723 in the usage mode corresponds to the control operation of changing to a previous performance mode. Additionally or alternatively, the plurality of performance modes may include progressive modes each associated with a different degree of stiffness of the suspension of the head portion 740, or may include progressive modes each associated with a different contour-following function.

In addition, when the personal care apparatus 700 of the present embodiment is in the control mode, the first button 721, the second button 722, the third button 723, and the fourth button 724 can be used as a navigation pad to perform control operations of a display apparatus. Specifically, actuation of the first button 721 in the control mode corresponds to the control operation of "move up", actuation of the fourth button 724 in the control mode corresponds to the control operation of "move down", actuation of the second button 722 in the control mode corresponds to the control operation of "move right", and actuation of the third button 723 in the control mode corresponds to the control operation of "move left". As discussed with reference to FIG. 3 above, control signals corresponding to the control operations of the display apparatus may be transmitted to the display apparatus via the connection between the personal care apparatus 700 and the display apparatus.

Figure 8:
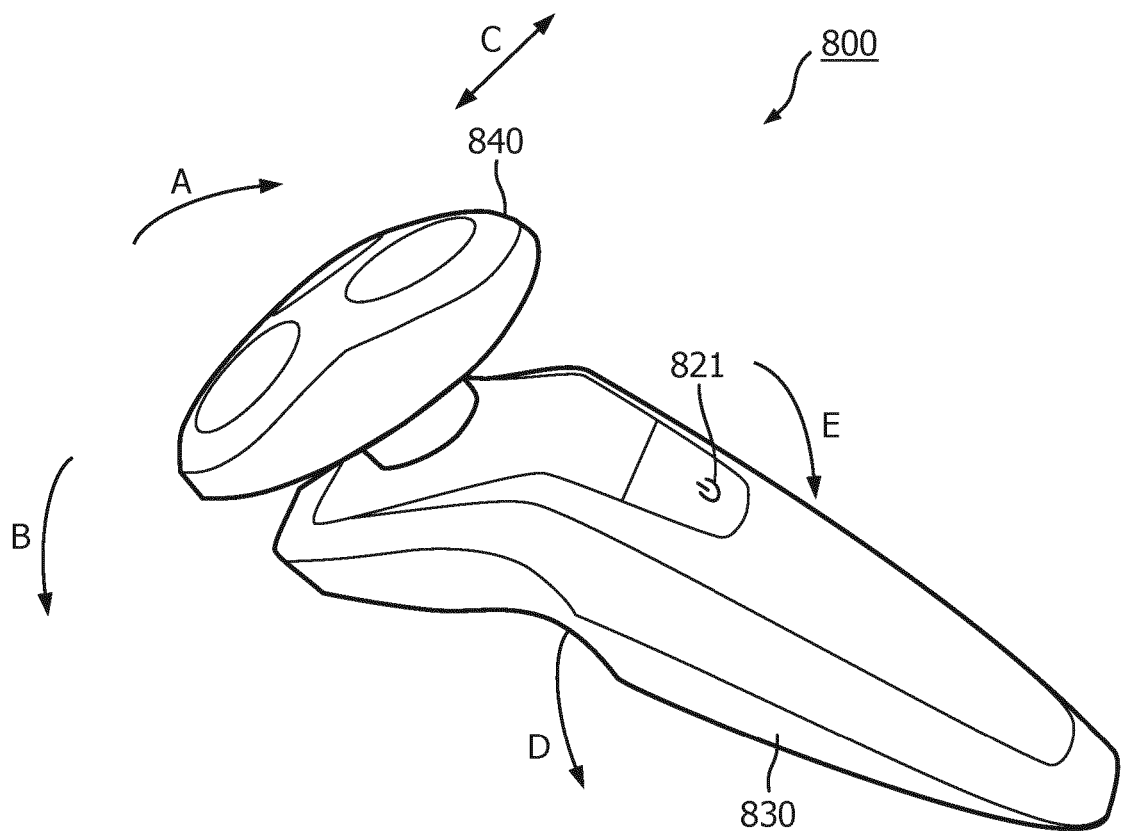
FIG. 8 is a perspective view of a personal care apparatus according to another embodiment.

The personal care apparatus 800 of FIG. 8 comprises a handle portion 830 and a head portion 840. At the handle portion 830, there is provided a first button 821. In this embodiment, actuation of the first button 821 corresponds to switching on or switching off the personal care apparatus 800, depending on a current on/off status of the personal care apparatus 800. Furthermore, the personal care apparatus 800 of this embodiment is configured such that a movement of the personal care apparatus 800 corresponding to a user picking up the personal care apparatus 800 from a stationary position is detected as the second predetermined user maneuver by the first control unit (not shown in the drawing), wherein the second predetermined user maneuver corresponds to a change of operation mode of the personal care apparatus 800. Therefore, when the user picks up the personal care apparatus 800 from a stationary position, the current operation mode is changed from the usage mode to the control mode, or vice versa.

Moreover, the first control unit of the personal care apparatus 800 in this embodiment is configured to determine different movements of the personal care apparatus 800 as different user maneuvers, wherein each of these different user maneuvers correspond to a particular control operation of the personal care apparatus 800 when it is in the usage mode and corresponds to a particular control operation of a display apparatus when the personal care apparatus 800 is in the control mode. In more detail, as shown in FIG. 8, the personal care apparatus 800 can be rotated (or tilted, moved, jerked, etc.) along four different orientations or directions (as represented by arrows A, B, C, and D) as well as laterally (as represented by arrow E). In this embodiment, each of the movement as demonstrated by arrows A to E in FIG. 8 respectively correspond to different control operations of either the personal care apparatus 800 itself or a connected display apparatus, depending on the current operation mode of the personal care apparatus 800.

Specifically, in the present embodiment, movement of the personal care apparatus 800 along arrow A in the usage mode corresponds to the control operation of increasing a vibration/rotation speed of the cutting units at the head portion 840, movement of the personal care apparatus 800 along arrow B during the usage mode corresponds to the control operation of reducing a vibration/rotation speed of the cutting units at the head portion 840, and movement of the personal care apparatus 800 along arrow C in the usage mode corresponds to the control operation of changing an orientation of the head portion 840 with respect to the handle portion 830 of the personal care apparatus 800. Also, movement of the personal care apparatus 800 along arrow D in the usage mode corresponds to the control operation of changing to a next performance mode, and movement of the personal care apparatus 800 along arrow E in the usage mode corresponds to the control operation of changing to a previous performance mode.

Furthermore, movement of the personal care apparatus 800 along the orientation or directions represented by arrows A to E are to be used as a 5-way navigation to perform control operations of a display apparatus. Specifically, movement of the personal care apparatus 800 along arrow A in the control mode corresponds to the control operation of "move up", movement of the personal care apparatus 800 along arrow B in the control mode corresponds to the control operation of "move down", movement of the personal care apparatus 800 along arrow D in the control mode corresponds to the control operation of "move left", movement of the personal care apparatus 800 along arrow E in the control mode corresponds to the control operation of "move right", and movement of the personal care apparatus 800 along arrow C corresponds to the control operation of "select". As discussed with reference to FIG. 3 above, control signals corresponding to the control operations of the display apparatus may be transmitted to the display apparatus via the connection between the personal care apparatus 800 and the display apparatus.

Figure 10A:
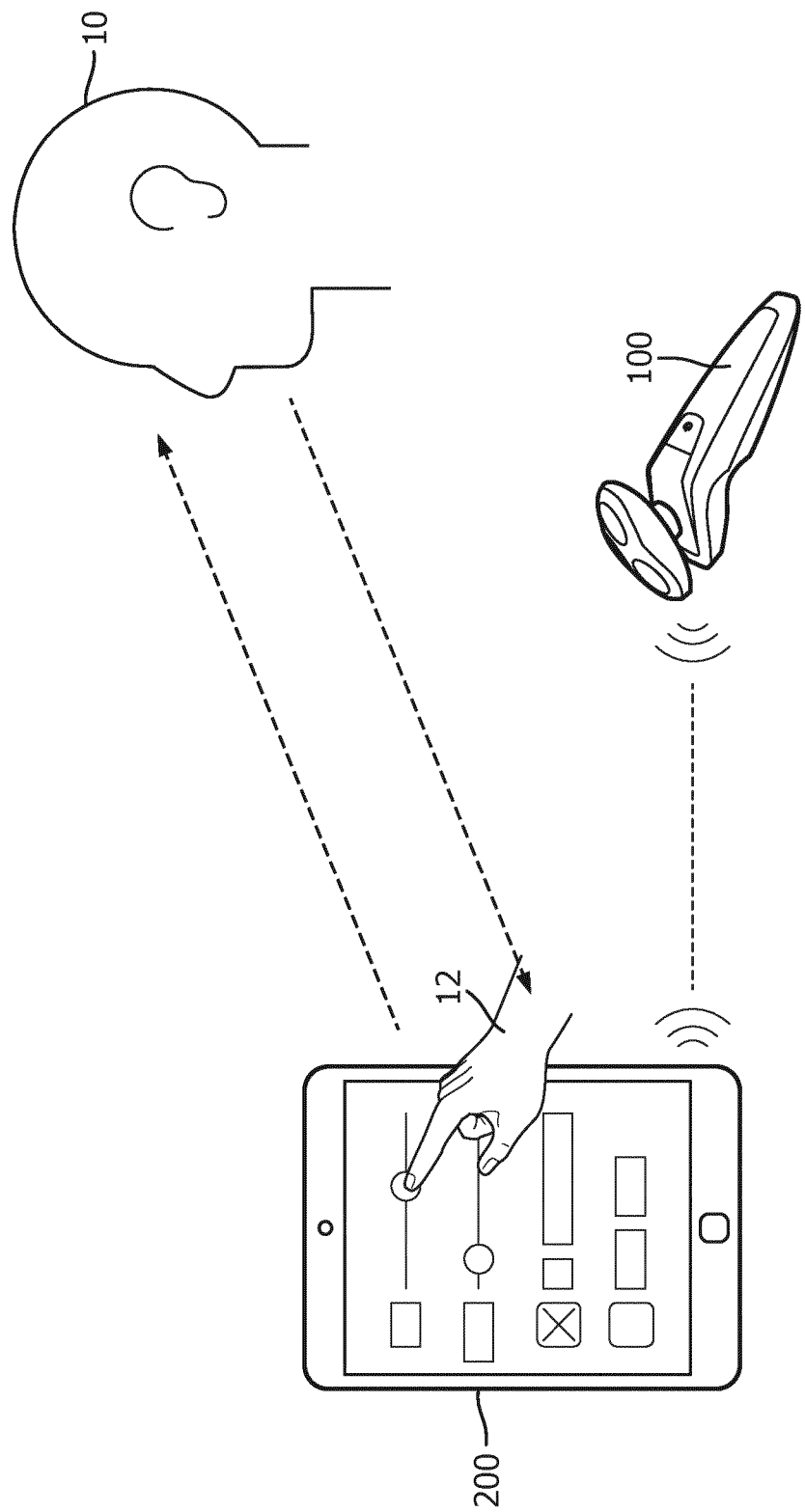
FIG. 10A is a diagram showing how the display apparatus in the system of FIG. 3 can be controlled directly.
Figure 10B:
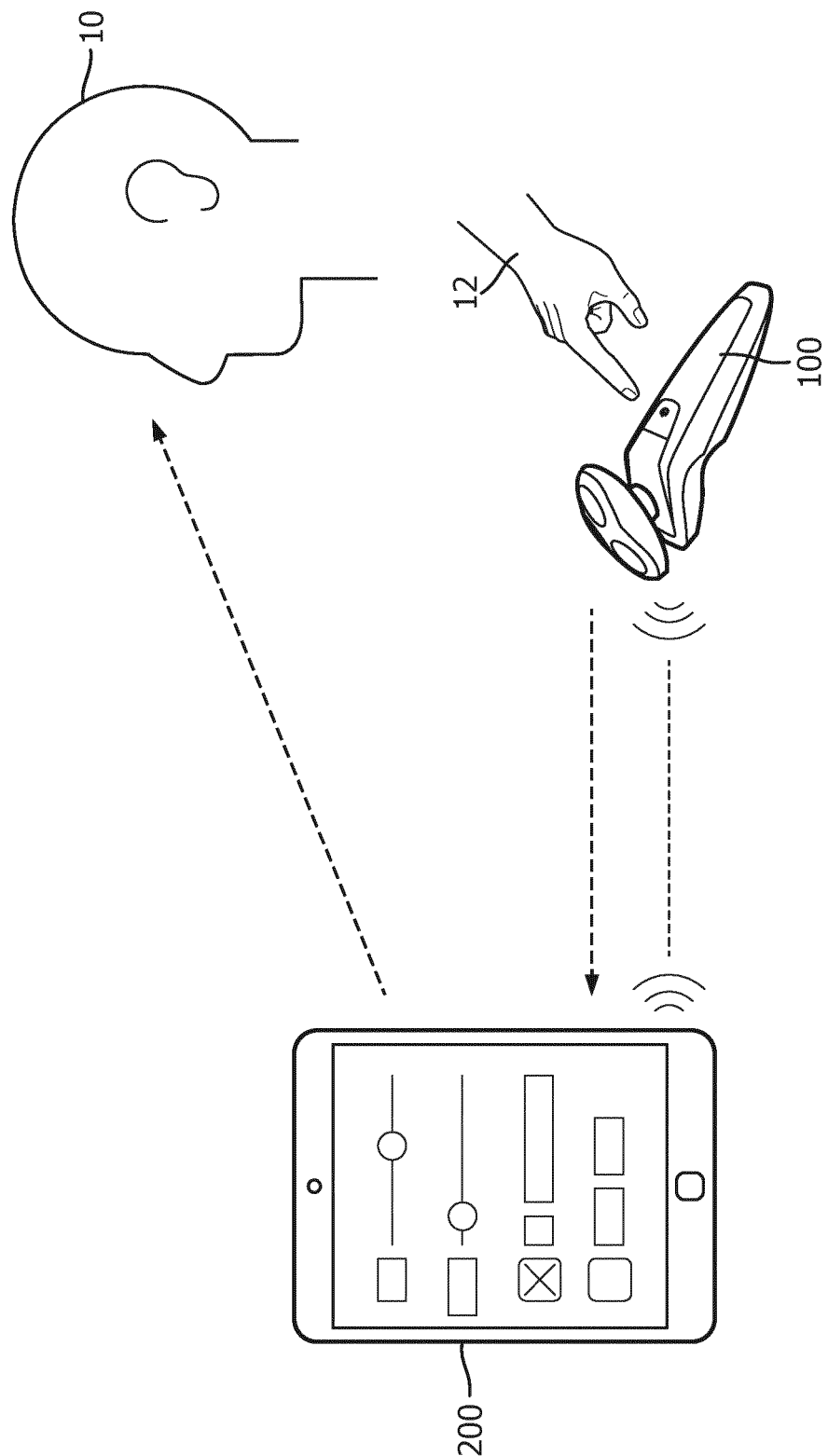
FIG. 10B is a diagram showing how the display apparatus in the system of FIG. 3 can be controlled via the personal care apparatus of FIG. 3.

FIG. 10A is a diagram showing how the display apparatus 200 in the system of FIG. 3 can be controlled directly, and FIG. 10B is a diagram showing how the display apparatus 200 in the system of FIG. 3 can be controlled via the personal care apparatus 100. Although FIGS. 10A and 10B show the personal care apparatus 100 as an electric shaver and the display apparatus 200 as a tablet computer, it will be appreciated that in alternative embodiments the personal care apparatus 100 may be practically implemented as other types of devices, e.g. an electric hair clipper as the personal care apparatus and a smart mirror as the display apparatus.

As shown in FIG. 10A, the user 10 can directly control the display apparatus 200 by means of an input 12 via the touch screen of the display apparatus 200, and as shown in FIG. 10B, the user can also control the display apparatus 200 by means of performing user maneuver(s) at the personal care apparatus 100 and through the wireless connection between the personal care apparatus 100 and the display apparatus 200 as illustrated. The latter control is achieved through transmission of control signals from the personal care apparatus 100 to the display apparatus 200 (represented by the dotted line between the personal care apparatus 100 and the display apparatus 200 in the drawings). The direct control of the display apparatus 200 by the user may be performed when the personal care apparatus 200 is in the usage mode or when the personal care apparatus 100 is switched off, and the control of the display apparatus 200 via the personal care apparatus 100 may be performed when the personal care apparatus is in the control mode.

Before, during, or after the user performs a personal care activity using the personal care apparatus, the display apparatus 200 is configured to provide information via its user interface, as indicated by the dashed arrows pointing towards the user 10 in both FIGS. 10A and 10B. Specifically, the second control unit (not shown in this drawing) of the display apparatus 200 is configured to control the display apparatus 200 to output information in the form of one or more graphical user interface elements or alongside one or more graphical user interface elements. The provided information may relate to the personal care activity performed by the user using the personal care apparatus 100, for example feedback on a progress of the personal care activity being performed, guidance information on how to perform the personal care activity, operational parameters (e.g. motor speed, exposure of the head portion of the electric shaver) of the personal care apparatus 100, a warning relating to operational parameters of the personal care apparatus 100 and/or the personal care activity, physiological data of a user, or historical and/or trend data associated with the personal care activity being performed or the personal care apparatus 100.

FIG. 11 is a table illustrating the correspondence between a number of different user maneuvers and a number of control operations during an off status, a control mode, and a usage mode of the personal care apparatus 600 of FIG. 6. Although the table of FIG. 11 is explained below with reference to the personal care apparatus 600 of FIG. 6, it will be appreciated that the correspondence as described below may also apply to other embodiments described herein. It will also be appreciated that in alternative embodiments, the correspondence between the user maneuvers and the control operations may be different from what is described herein, based on one or more factors such as a type of the personal care apparatus (e.g. whether it is an electric shaver or a skin cleansing apparatus), etc.

As shown in the table, under the column "event", there is provided a plurality of different user maneuvers including "picking-up" user maneuver 1110, "power on/off" user maneuver 1120, "increase" user maneuver 1130, "decrease" user maneuver 1140, and "change mode" user maneuver 1150. The "picking-up" user maneuver 1110 corresponds to when a movement or motion corresponding to a user picking up the personal care apparatus 600 from a stationary position is detected. As described above, this movement or motion may be detected using an inertial measurement unit which comprises at least one of an accelerometer, a motion sensing unit, a vibration sensing unit, and a barometer. The "power on/off" user maneuver 1120 corresponds when actuation of the first button 621 of the personal care apparatus 600 is detected. The "increase" user maneuver 1130 corresponds to when actuation of the second button 622 of the personal care apparatus 600 is detected. The "decrease" user maneuver 1140 corresponds to when actuation of the third button 623 of the personal care apparatus 600 is detected. The "change mode" user maneuver 1150 corresponds to when actuation of the fourth button 624 is detected.

Referring to the "off" column of the table, when the personal care apparatus 600 is in the off status, i.e. when the personal care apparatus 600 is switched off, each of the user maneuvers 1110-1150 described above would trigger activation of the personal care apparatus 600, i.e. switching on the personal care apparatus 600 and automatic connection of the personal care apparatus 600 with a display apparatus. In addition, the "picking-up" user maneuver 1110 would trigger automatic initiation of the control mode. The "power on/off" user maneuver 1120 would trigger switching on of a motor unit at the personal care apparatus 600 and initiation of the usage mode. Each of the "increase" user maneuver 1130, the "decrease" user maneuver 1140, and the "change mode" user maneuver 1150 would trigger initiation of the control mode.

Referring to the "control" column of the table, when the personal care apparatus 600 is in the control mode, the "picking-up" user maneuver 1110 would not trigger any control operation. However, the "power on/off" user maneuver 1120 would trigger switching on of a motor unit at the personal care apparatus 600 and also changing the current operation mode to the usage mode. The "increase" user maneuver 1130 would trigger moving up to a next user interface element at the (connected) display apparatus, while the "decrease" user maneuver 1140 would trigger moving down to a next user interface element at the (connected) display apparatus. Furthermore, the "change mode" user maneuver 1150 would trigger a change in value of a currently selected user interface element at the (connected) display apparatus.

Referring to the "usage" column of the table, when the personal care apparatus 600 is in the usage mode, the "picking-up" user maneuver 1110 would not trigger any control operation. However, the "power on/off" user maneuver 1120 would trigger switching off of a motor unit at the personal care apparatus 600 and also changing the current operation mode to the control mode. The "increase" user maneuver 1130 would trigger increasing the speed of the motor unit, while the "decrease" user maneuver 1140 would trigger reducing the speed of the motor unit. Furthermore, the "change mode" user maneuver 1150 would trigger the control operation of toggling a suspension lock of the head portion of the personal care apparatus 600.

The last row of the table also describes a scenario in which no user maneuver is performed within a 30 second time period. Referring to this row, when no user maneuver is performed or detected by the personal care apparatus 600 during the control mode, the personal care apparatus 600 would be switched off automatically.

Figure 12:
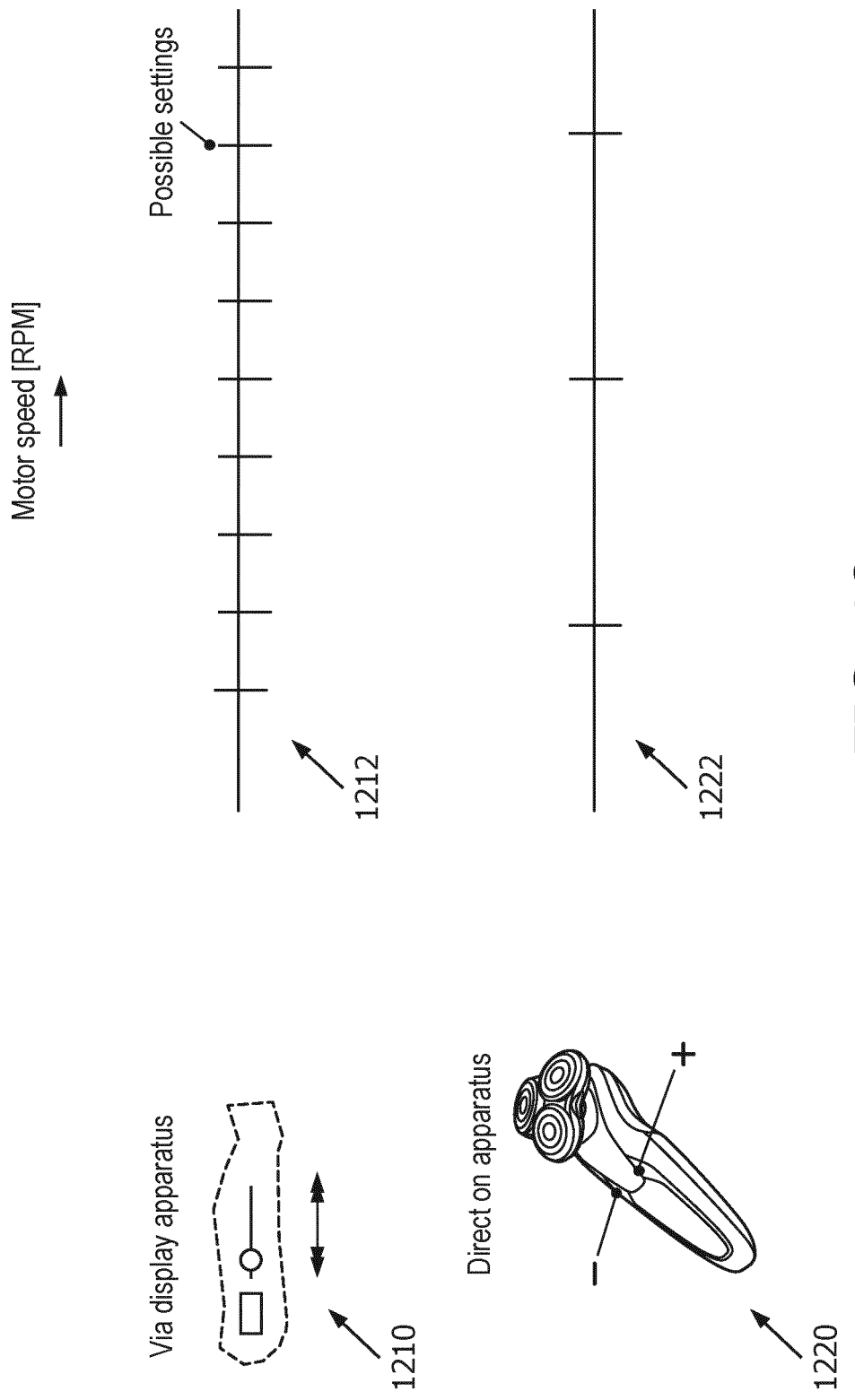
FIG. 12 is a diagram showing how a motor speed setting of a personal care apparatus can be changed via a display apparatus and directly at the personal care apparatus.

FIG. 12 is a diagram showing how a motor speed setting of a personal care apparatus can be changed via a display apparatus and directly at the personal care apparatus.

As shown in FIG. 12, the motor speed setting of a personal care apparatus, i.e. the rotation speed of a motor unit provided at the personal care apparatus (e.g. an electric shaver or a skin cleansing apparatus) can be adjusted either via a user interface element 1210 provided at a connected display apparatus or directly at the personal care apparatus 1220 (by actuation of buttons at the personal care apparatus). The user interface element 1210 in this embodiment is provided in the form of a slider element that can be manipulated by moving an indicator horizontally while the personal care apparatus is in the control mode. The personal care apparatus 1220 is provided with two buttons labelled "+" and "−" to respectively indicate a control operation of increasing the motor speed and a control operation of decreasing the motor speed during the usage mode.

In the present embodiment, adjustment of motor speed settings via the display apparatus is performed in a first scale 1212 having nine possible settings, while adjustment of motor speed settings directly at the personal care apparatus is performed in a second scale 1222 having three possible settings. Therefore, by controlling the motor speed settings via the display apparatus instead of directly at the personal care apparatus, the user is able to achieve more fine-tuned adjustment of setting(s) via a richer user interface in order to achieve a desired performance of the personal care apparatus.

There is thus provided an improved personal care apparatus, a method of operating thereof, and a system comprising the personal care apparatus and a display apparatus, which overcome the existing problems.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines, and may be structured as an object-oriented program with classes. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein.

These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A personal care apparatus for supporting a user in performing a personal care activity, the personal care apparatus being configured to connect to and remotely control a display apparatus spaced apart from the personal care apparatus, wherein the personal care apparatus comprises a first control unit configured to:
    determine a current operation mode of the personal care apparatus as a usage mode in which the personal care apparatus is controlled or a control mode in which the personal care apparatus controls the display apparatus; and
    detect a first predetermined user maneuver,
    wherein in the usage mode at least one or more user maneuvers of the personal care apparatus correspond to controlling the personal care apparatus itself,
    wherein in the control mode at least one or more user maneuvers of the personal care apparatus correspond to controlling the display apparatus,
    wherein the first predetermined user maneuver corresponds to a control operation of the personal care apparatus in the usage mode and corresponds to a control operation of the display apparatus in control mode,
    wherein when the first predetermined user maneuver is detected, the first control unit is further configured to:
        perform the control operation of the personal care apparatus when the determined current operation mode is the usage mode, or
        transmit a control signal corresponding to the control operation of the display apparatus to the display apparatus when the determined current operation mode is the control mode such that the user can operate the personal care apparatus so as to remotely control the display apparatus.

2. The personal care apparatus according to claim 1, wherein the first control unit is further configured to:
    detect a second predetermined user maneuver, wherein the second predetermined user maneuver corresponds to an initiation of an operation mode of the personal care apparatus or a change of operation mode of the personal care apparatus; and
    determine the current operation mode of the personal care apparatus based on the detected second predetermined user maneuver.

3. The personal care apparatus according to claim 2, wherein the second predetermined user maneuver corresponds to an initiation of the control mode, and the first control unit is further configured to establish, upon detection of the second predetermined user maneuver, a connection with the display apparatus.

4. The personal care apparatus according to claim 1, wherein the first control unit is configured to determine the current operation mode of the personal care apparatus based on whether a connection is established between the personal care apparatus and the display apparatus.

5. The personal care apparatus according to claim 1, further comprising an inertial measurement unit configured to detect a change in orientation and/or movement of the personal care apparatus, wherein the first predetermined user maneuver is a predetermined change of orientation of the personal care apparatus and/or a predetermined movement of the personal care apparatus.

6. The personal care apparatus according to claim 1, wherein the first control unit is further configured to:
    determine at least one of a stage of the personal care activity performed by the user and a status of the personal care apparatus; and
    determine the current operation mode of the personal care apparatus based on at least one of the determined stage of personal care activity and the determined status of the personal care apparatus.

7. The personal care apparatus according to claim 6, wherein the first control unit is configured to determine at least one of a stage of the personal care activity performed by the user and a status of the personal care apparatus based on at least one of a measured degree of pressure exerted by the user on at least a part of the personal care apparatus, a measured level of electrical resistance at the personal care apparatus, and a proximity of the personal care apparatus with a body part of the user.

8. The personal care apparatus according to claim 6, further comprising a motor unit, wherein the first control unit is configured to determine at least one of a stage of the personal care activity performed by the user and a status of the personal care apparatus based on a driving status of the motor unit.

9. The personal care apparatus according to claim 1, wherein the control operation of the personal care apparatus comprises at least one of: switching on the personal care apparatus, switching off the personal care apparatus, changing a performance mode of the personal care apparatus, changing a speed setting of the personal care apparatus, and changing a time setting of the personal care apparatus.

10. A system comprising:
    the personal care apparatus according to claim 1; and
    the display apparatus.

11. The system according to claim 10, wherein the display apparatus comprises a second control unit configured to:

control the display apparatus to output one or more graphical user interface elements;

receive a control signal from the personal care apparatus; and change a value of at least one of the one or more graphical user interface elements based on the received control signal.

12. The system according to claim 10, wherein the display apparatus comprises a second control unit, and at least one of the first control unit and the second control unit is configured to determine at least one of a stage of the personal care activity performed by the user and a status of the personal care apparatus, and wherein the second control unit is further configured to control the display apparatus based on at least one of the determined stage of personal care activity and the determined status of the personal care apparatus.

13. The system according to claim 10, wherein the display apparatus is a smart mirror.

14. A method of operating a personal care apparatus, wherein the personal care apparatus is configured to connect to and remotely control a display apparatus spaced apart from the personal care apparatus, the method comprising:

determining a current operation mode of the personal care apparatus as a usage mode in which the personal care apparatus is controlled or a control mode in which the personal care apparatus controls the display apparatus; and detecting a first predetermined user maneuver, wherein the first predetermined user maneuver corresponds to a control operation of the personal care apparatus in the usage mode and corresponds to a control operation of the display apparatus in control mode, wherein in the usage mode at least one or more user maneuvers of the personal care apparatus correspond to controlling the personal care apparatus itself, wherein in the control mode at least one or more user maneuvers of the personal care apparatus correspond to controlling the display apparatus, wherein, when the first predetermined user maneuver is detected, the method further comprises:

when the determined current operation mode is the usage mode, performing the control operation of the personal care apparatus, or when the determined current operation mode is the control mode, transmitting a control signal corresponding to the control operation of the display apparatus to the display apparatus such that the user can operate the personal care apparatus so as to remotely control the display apparatus.

15. A non-transitory computer readable medium having computer or processor readable code embodied therein, the computer readable code being configured such that, on execution by the computer or processor, the computer or processor is caused to perform the method as claimed in claim 14.

16. The system of claim 13, wherein the smart mirror has a touch screen and is configured to display multiple user interface elements, and the personal care apparatus is configured to remotely select and activate a user interface element among the multiple user interface elements.

17. The system of claim 16, wherein the connection between the smart mirror and the personal care apparatus is a wireless connection.

18. The system of claim 16, wherein the personal care apparatus is an electric shaver.

19. The system of claim 16, wherein the personal care apparatus comprises a button, and wherein the button controls an operation of the personal care apparatus in the usage mode, and the button controls an operation of the smart mirror in the control mode.

20. The system of claim 19, wherein the personal care apparatus is configured to switch back and forth between the usage and control modes when shaken.

* * * * *